(12) United States Patent
Andersson et al.

(10) Patent No.: US 9,538,242 B2
(45) Date of Patent: Jan. 3, 2017

(54) METHOD AND USER NODE FOR RECEPTION OF A TV SERVICE

(71) Applicant: Telefonaktiebolaget L M Ericsson (publ), Stockholm (SE)

(72) Inventors: Ola Andersson, Spånga (SE); Rafael Coradin, Curitiba (BR); Claudia Ricardo, Curitiba (BR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/773,429

(22) PCT Filed: Mar. 8, 2013

(86) PCT No.: PCT/SE2013/050209
§ 371 (c)(1),
(2) Date: Sep. 8, 2015

(87) PCT Pub. No.: WO2014/137260
PCT Pub. Date: Sep. 12, 2014

(65) Prior Publication Data
US 2016/0021424 A1    Jan. 21, 2016

(51) Int. Cl.
*H04N 7/173* (2011.01)
*H04N 21/462* (2011.01)
(Continued)

(52) U.S. Cl.
CPC .......... *H04N 21/4622* (2013.01); *H04H 20/20* (2013.01); *H04N 21/4383* (2013.01);
(Continued)

(58) Field of Classification Search
CPC ................................................ H04N 21/4622
See application file for complete search history.

(56) References Cited

U.S. PATENT DOCUMENTS 8,826,333 B2    9/2014  Fujimoto
2008/0139109 A1  6/2008  Ewertz
(Continued)

FOREIGN PATENT DOCUMENTS

EP    1 971 141 A2    9/2008
EP    2 242 260 A1    10/2010
(Continued)

OTHER PUBLICATIONS

International Search Report and Written Opinion of the International Searching Authority, Application No. PCT/SE2013/050209, Feb. 7, 2014.
(Continued)

*Primary Examiner* — Michael Hong
(74) *Attorney, Agent, or Firm* — Myers Bigel, P.A.

(57) ABSTRACT

A method and a user node for enabling reception of a TV service. The user node operates in a first reception mode of receiving the TV service as signals broadcasted over the air and in a second reception mode of receiving the TV service as a media stream over an Internet Protocol Television, IPTV, link The user node monitors quality of the broadcasted signals when receiving the TV service in the first reception mode. The user node switches operation from the first reception mode to the second reception mode responsive to the monitored quality of the broadcasted signals being below a first threshold. Thereafter, the user node receives the TV service over the IPTV link in the second reception mode. The TV service can be properly received and played out with satisfying user experience irrespective of the broadcasted signals over the air not reaching the user node with sufficient quality.

16 Claims, 3 Drawing Sheets

(51) Int. Cl.
*H04N 21/438* (2011.01)
*H04N 21/442* (2011.01)
*H04H 20/20* (2008.01)
*H04N 21/61* (2011.01)
*H04N 21/643* (2011.01)
*H04N 21/647* (2011.01)
H04H 20/26 (2008.01)

(52) U.S. Cl.
CPC ... *H04N 21/44209* (2013.01); *H04N 21/6125* (2013.01); *H04N 21/64322* (2013.01); *H04N 21/64738* (2013.01); *H04H 20/26* (2013.01)

(56) References Cited

U.S. PATENT DOCUMENTS

| | | | |
|---|---|---|---|
| 2010/0203823 A1* | 8/2010 | Apaar | H04H 20/20 |
| | | | 455/3.06 |
| 2012/0042349 A1* | 2/2012 | Ng | H04N 21/41407 |
| | | | 725/109 |
| 2012/0096502 A1 | 4/2012 | Yae et al. | |

FOREIGN PATENT DOCUMENTS

| | | |
|---|---|---|
| WO | WO 2007/113410 | 10/2007 |
| WO | WO 2009/140994 A1 | 11/2009 |
| WO | WO 2010/020934 A1 | 2/2010 |
| WO | WO 2012/096122 A1 | 7/2012 |

OTHER PUBLICATIONS

Communication with Supplemental European Search Report; dated Mar. 11, 2016.

\* cited by examiner

METHOD AND USER NODE FOR RECEPTION OF A TV SERVICE

CROSS REFERENCE TO RELATED APPLICATION

This application is a 35 U.S.C. §371 national stage application of PCT International Application No. PCT/SE2013/050209, filed on Mar. 8, 2013, the disclosure and content of which is incorporated by reference herein in its entirety. The above-referenced PCT International Application was published in the English language as International Publication No. WO 2014/137260A1 on Sep. 12, 2014.

TECHNICAL FIELD

The present disclosure relates generally to a method and a user node for enabling reception of a TV service, the user node being operable to receive the TV service both as signals broadcasted over the air and as a media stream over a digital IPTV link.

BACKGROUND

Today, different types of devices are available for receiving and playing out a TV service, including a so-called "Set Top Box", STB, which receives digital TV signals and decodes the signals for playout on a playing entity typically comprising a viewing screen and a loudspeaker system. The TV service may be received as broadcasted signals over the air or as a media stream delivered through a cable based on the Internet Protocol IP thus forming a fixed IPTV link, the latter option being commonly referred to as "IPTV" for short. The TV service can be delivered from a TV service provider either by means of a broadcasting satellite or terrestrial antenna in the case of delivery over the air, or by means of an IPTV server or the like in the case of delivery over a fixed IPTV link. In the latter case, the TV service may be delivered as a multicast service to multiple receivers at the same time or as a unicast service to a single receiver at a time.

Some types of devices for receiving TV services have dual functionality and are capable of receiving the TV service both as broadcasted signals over the air and as a media stream over a digital IPTV link, which may be referred to as a hybrid TV solution and a dual mode device. If both delivery methods are available, it is generally most economical to receive the TV service as broadcasted signals over the air since the other alternative of receiving a media stream over IPTV link is associated with additional costs for transporting data over a distribution network comprising the fixed IPTV link. Depending on the capacity of that distribution network, it may sometimes be heavily loaded with bandwidth consuming data traffic or may even become congested, particularly if many users are watching TV at the same time with high resolution requiring a high data throughput for each user over the IPTV link.

However, the first option of receiving the TV service as broadcasted signals over the air may sometimes be subjected to deteriorated playout quality due to weak signal reception which may be caused by "bad" weather such as during heavy rains, snow or storms when the signals undergo severe losses when travelling from the broadcasting TV station to the receiving user's antenna. In some cases, the signal may even be completely lost such that the TV service is interrupted and the TV screen goes blank.

A typical reaction amongst users when the TV service quality goes down is to reboot the TV equipment, e.g. STB, in an attempt to regain better signal reception and quality. This reboot operation involves communication of configuration data with a server of the TV service provider and requires also some processing by the server, and if several users try to reboot their STBs at the same time, the server may become overloaded and may not be able to deliver its services properly. Typically, this reboot operation does not help when the received signals are too weak or too distorted anyway. It is thus a problem that users receiving a TV service over the air may experience bad quality or even interrupted service during conditions when the signal propagation is disturbed, e.g. by bad weather. It is also a problem that this situation may result in overloading the TV service provider's server due to many reboot operations at roughly the same time.

SUMMARY

It is an object of embodiments described herein to address at least some of the problems and issues outlined above. It is possible to achieve this object and others by using a method and a user node as defined in the attached independent claims.

According to one aspect, a method is provided, to be performed by a user node, to enable reception of a TV service. The user node is operable in a first reception mode of receiving the TV service as signals broadcasted over the air and in a second reception mode of receiving the TV service as a media stream over an Internet Protocol Television, IPTV, link. In this method, the user node monitors quality of the broadcasted signals when receiving the TV service in the first reception mode. The user node switches operation from the first reception mode to the second reception mode when the monitored quality of the broadcasted signals is below a first threshold and receives the TV service over the IPTV link in the second reception mode. The user node may later switch operation back to the first reception mode once the monitored quality of the broadcasted signals is above a second threshold which may be higher than the first threshold.

In this way, the TV service can automatically be received properly and watched with satisfactory results without undue costs, even if the broadcasted signals over the air should be severely disturbed or even lost altogether before reaching the user node, e.g. due to bad weather. It is thus beneficial that no manual action is required and that the costs for the TV service can be kept low by using the less costly first reception mode as far as possible and by using the bandwidth consuming second reception mode only when the first reception mode cannot provide a satisfying user experience.

According to another aspect, a user node is configured to enable reception of a TV service. This user node is operable in a first reception mode of receiving the TV service as signals broadcasted over the air and in a second reception mode of receiving the TV service as a media stream over an Internet Protocol Television, IPTV, link. The user node comprises a first receiving unit adapted to receive the TV service in the first reception mode and a second receiving unit adapted to receive the TV service in the second reception mode.

The user node further comprises a monitoring unit that is adapted to monitor quality of the broadcasted signals when receiving the TV service in the first reception mode, and a logic unit adapted to switch operation from the first reception mode to the second reception mode when the monitored quality of the broadcasted signals is below a first threshold.

The above method and user node may be configured and implemented according to different optional embodiments to accomplish further features and benefits, to be described below.

BRIEF DESCRIPTION OF DRAWINGS

The solution will now be described in more detail by means of exemplary embodiments and with reference to the accompanying drawings, in which.

DETAILED DESCRIPTION

Figure 1:
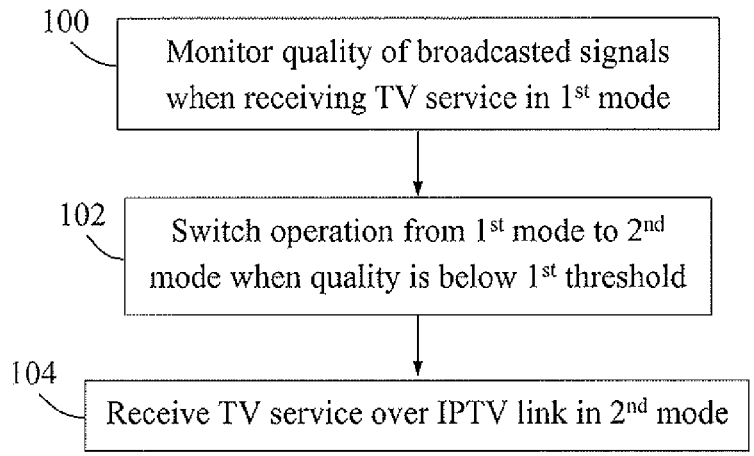
FIG. 1 is a flow chart illustrating a procedure in a user node when receiving a TV service, according to some possible embodiments.

Briefly described, a solution in a user node is presented to accomplish satisfactory user experience as well as limited costs when receiving and watching a TV service. This can be achieved by providing a virtually seamless and automatic switch between a first reception mode of receiving the TV service as broadcasted signals over the air and a second reception mode of receiving the TV service over a wired IPTV link, depending on quality of the broadcasted signals over the air. This is made possible by the user node monitoring the quality of the broadcasted signals when operating in the first reception mode, wherein the user node automatically switches to the second reception mode when the monitored quality of the broadcasted signals falls below a certain threshold which may be configurable and adaptive. Thereby, it can be ensured that the TV service can be received and watched properly without undue costs, even if the broadcasted signals should be severely disturbed or even lost altogether before reaching the user node, e.g. due to bad weather, precipitation or other circumstances harmful to the propagation of signals through the air. The costs for the TV service can thus be kept low by using the less costly first reception mode as far as possible and by using the bandwidth consuming second reception mode only when the first reception mode cannot provide a satisfactory user experience.

In this disclosure, the term "user node" is used to represent any equipment that can be used at a TV consumer's premises, e.g. a TV set and/or an STB or similar device, for receiving and watching a TV service. It is assumed in the following that the described user node is operable both in the first reception mode of receiving the TV service as signals broadcasted over the air, effectively forming a media stream, and in the second reception mode of receiving the TV service as a media stream over an IPTV link. Thus, the first and second reception modes refer to two different ways of receiving the same stream, i.e. over the air and through a cable, respectively.

An exemplifying procedure for enabling reception of a TV service by means of a user node will now be described with reference to the flow chart in FIG. 1 which illustrates actions that can be performed by the user node. In a first shown action 100, the user node monitors the quality of the broadcasted signals when receiving the TV service in the first reception mode. In the first reception mode, the user node thus receives the broadcasted signals forming a media stream over the air. The user node may use any existing technique for monitoring the signal quality, e.g. by measurements of signal strength and/or noise, which is not necessary to describe here in further detail to understand the solution. It should be noted that the user node may be configured to first and foremost choose the first reception mode, which is associated with lower costs than the second reception mode, as long as the monitored signal quality is deemed "acceptable" for proper playout of the TV service.

Another action 102 illustrates that the user node switches operation from the first reception mode to the second reception mode when the monitored quality of the broadcasted signals is below a first threshold, which will be elaborated in more detail later in this disclosure. Thus, as long as the signal quality remains above the first threshold, i.e. the broadcasted signals are received properly such that the TV service can be played out with acceptable results, the user node operates in the first reception mode which is typically preferable in terms of costs and network load, as said above.

In a final shown action 104, the user node receives the TV service over the IPTV link in the second reception mode. Meanwhile, the user node may carry on monitoring the quality of the broadcasted signals even when operating in the second reception mode and may in due time switch back to the first reception mode if the signal quality goes up and becomes acceptable again, e.g. due to improved weather situation and favorable signal propagation conditions. For example in a possible embodiment, another threshold, here called a second threshold, may be configured in the user node to determine when the user node should switch back to the second reception mode, which will be elaborated further below as well.

Another possible embodiment is that the above second threshold may be higher than the first threshold. Thereby, it may be avoided that the user node switches operation between the first and second reception modes too frequently, that is in a "ping-pong" manner, when the monitored signal quality fluctuates up and down around the threshold thus being deemed alternately acceptable and unacceptable for proper playout.

Yet another possible embodiment is that at least one of the first and second thresholds may be automatically adjustable based on the amount of variations or fluctuations of the monitored quality. For example, if the variations in signal quality are great, e.g. due to rapidly changing weather conditions such as intense but brief showers, it could be beneficial to automatically adjust one or both of the first and second thresholds such that the difference between them becomes relatively great to reduce the tendency of too frequent switches back and forth between the first and second reception modes during such conditions. This can be realized by increasing the higher second threshold, or decreasing the lower first threshold, or both. If the conditions for signal propagation becomes more stable and the variations in signal quality are reduced, the adjusted threshold(s) may return to a default setting.

In another possible embodiment, switching the operation from the first reception mode to the second reception mode comprises establishing an IPTV session to receive a TV channel that the user node is tuned to when receiving the TV service in the first reception mode. It is also possible to receive the TV service over the IPTV link in the second reception mode with a lower resolution than when receiving the TV service as broadcasted signals in the first reception mode. Thereby, the load on the network can be limited to avoid congestion problems in case many users switch to IPTV virtually at the same time, e.g. when a heavy storm or other bad weather has descended upon a densely populated area with many TV watchers.

Figure 2:
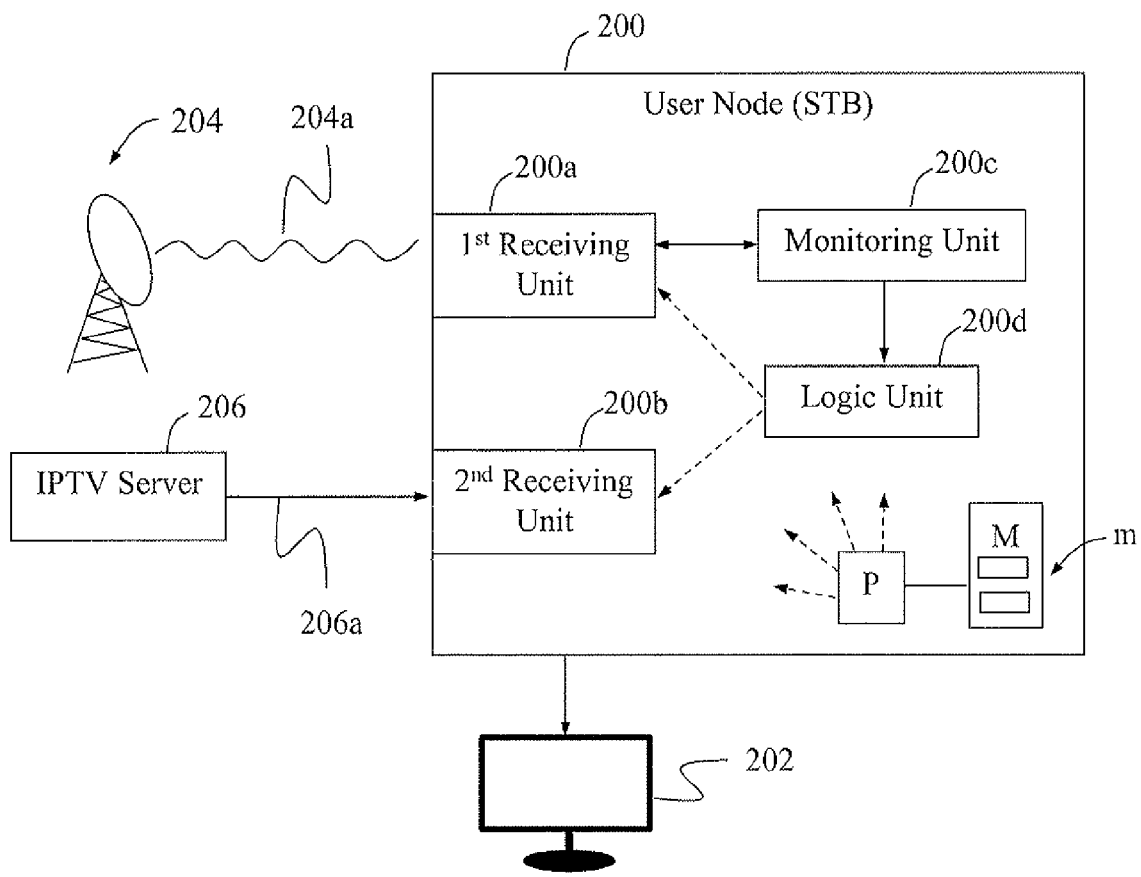
FIG. 2 is a block diagram illustrating a user node when receiving a TV service, according to further possible embodiments.

A detailed but non-limiting example of how a user node may be structured with some possible functional units to bring about the above-described operation of the user node for enabling reception of a TV service, is illustrated by the block diagram in FIG. 2. In this figure, a user node 200 is shown as an STB or similar being connected to a playout equipment including a TV screen 202. However, the user node 200 may in practice be integrated as a single entity as well together with a playout equipment for TV services, and the solution is not limited in this respect. A terrestrial broadcast antenna 204 and an IPTV server 206 are also shown, which are controlled and operated by one or more TV service providers to deliver the TV service both as broadcasted signals 204a over the air from the antenna 204 and as a media stream 206a over an IPTV link from the IPTV server 206, respectively. Technologies for delivering TV services in these two ways are well-known as such in this field and out of scope of this solution.

As in the example of FIG. 1, the user node 200 is operable in the first reception mode of receiving the TV service as signals broadcasted over the air from antenna 204 and decoding the received signals for playout, and in the second reception mode of receiving the TV service as a media stream from the IPTV server 206 over an IPTV link and decoding the received media stream for playout. The user node 200 comprises a first receiving unit 200a adapted to receive the TV service over the air in the first reception mode e.g. by means of a broadcast tuner, and a second receiving unit 200b adapted to receive the TV service over the IPTV link in the second reception mode. These receiving units 200a and 200b may be any conventional units that can be used in any dual mode device for reception of TV services.

The user node 200 further comprises a monitoring unit 200c adapted to monitor the quality of the broadcasted signals, initially when receiving the TV service in the first reception mode. The monitoring unit 200c may be configured to communicate with the first receiving unit 200a to collect signal measurements from this unit, which measurements may relate to received signal strength and/or noise. For example, the first receiving unit 200a may be configured to automatically send the measurements to the monitoring unit 200c on a regular basis. Alternatively or additionally, the monitoring unit 200c may be configured to poll the first receiving unit 200a to provide such measurements to the monitoring unit 200c. Furthermore, the monitoring unit 200c may collect/receive such measurements at relatively long intervals during periods when the signal propagation conditions are deemed stable and at shorter intervals during periods with less stable signal propagation conditions.

The user node 200 also comprises a logic unit 200d adapted to switch operation from the first reception mode to the second reception mode when the monitored quality of the broadcasted signals is below a first threshold. In more detail, the logic unit 200d may instruct the first receiving unit 200a to stop decoding the broadcasted signals and instruct the second receiving unit 200b to open and start decoding a media stream of the same TV service for playout.

For this aim, the units 200a and 200b need to be configured for reception of such instructions from the logic unit 200d.

It should be noted that FIG. 2 illustrates various functional units in the user node 200 and the skilled person is able to implement these functional units in practice using suitable software and hardware. Thus, the solution is generally not limited to the shown structures of the user node 200, and the functional units 200a-d may be configured to operate according to any of the features described in this disclosure, where appropriate.

The functional units 200a-d described above can be implemented in the user node 200 by means of program modules of a respective computer program comprising code means which, when run by a processor "P" causes the user node 200 to perform the above-described actions and procedures. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

Each computer program may be carried by a computer program product in the user node 200 in the form of a memory "M" having a computer readable medium and being connected to the processor P. The computer program product or memory M thus comprises a computer readable medium on which the computer program is stored e.g. in the form of computer program modules "m". For example, the memory M may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the user node 200.

The above user node 200 and its functional units 200a-d may be configured or adapted to operate according to various optional embodiments. In a possible embodiment, the logic unit 200d may be adapted to switch operation from the first reception mode to the second reception mode when the monitored quality of the broadcasted signals has remained below the first threshold for a first time interval. In another embodiment, the logic unit 200d may be further adapted to switch operation from the second reception mode back to the first reception mode when the monitored quality of the broadcasted signals is above a second threshold which may be higher than the first threshold.

Further possible embodiments are mentioned below. The logic unit 200d may be adapted to switch operation from the second reception mode back to the first reception mode when the monitored quality of the broadcasted signals has remained above the second threshold for a second time interval. The logic unit 200d may be further adapted to adjust at least one of the first and second thresholds based on the amount of variations/fluctuations of the monitored quality. When the operation is switched from the first reception mode to the second reception mode, the second receiving unit 200b may be adapted to establish an IPTV session to receive a TV channel that the user node is tuned to when receiving the TV service in the first reception mode. The second receiving unit 200b may be adapted to receive the TV service over the IPTV link in the second reception mode with a lower resolution than when receiving the TV service as broadcasted signals in the first reception mode.

Figure 3A:
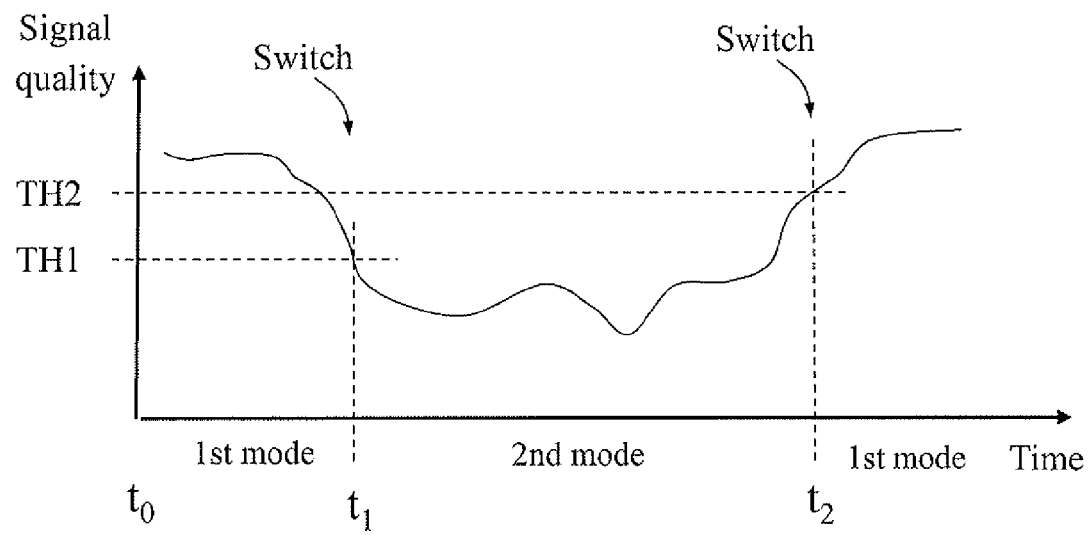
FIGS. 3a and 3b are diagrams illustrating examples of how a user node may operate depending on how a received signal quality changes over time, according to further possible embodiments.
Figure 3B:
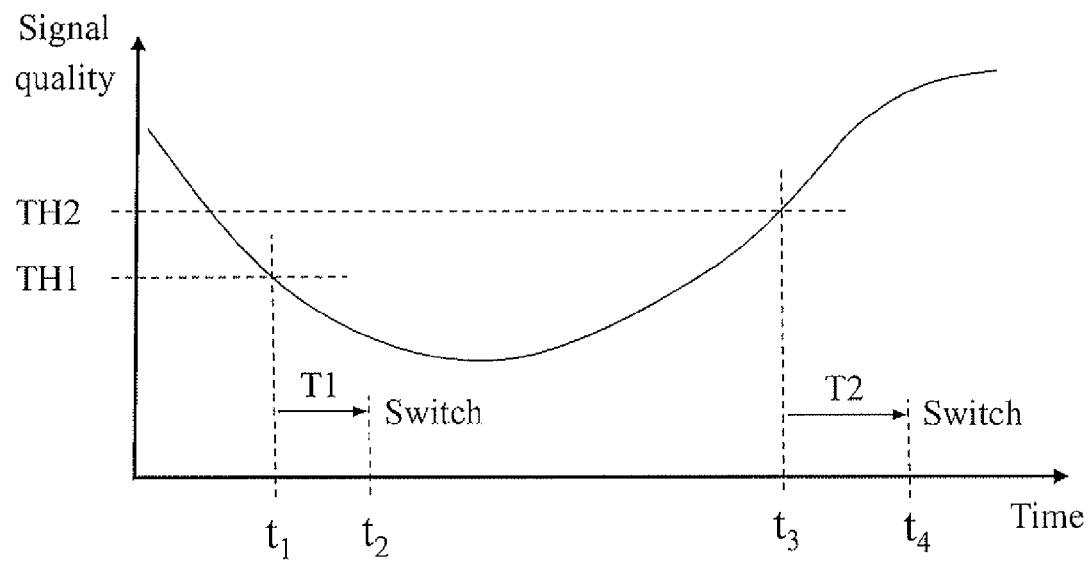

Some examples of how the above user node 200 may operate when receiving a TV service, depending on quality of broadcasted signals over the air, will now be described with reference to diagrams in FIGS. 3a and 3b showing how the signal quality may vary over time. It is assumed that the above-described first and second thresholds, denoted TH1 and TH2, have been configured in the logic unit 200d.

In FIG. 3a, the signal quality is monitored by the monitoring unit 200c from a time $t_0$ onwards and the user node 200 starts with operating in the first reception mode when the first receiving unit 200a provides received and decoded signals to the TV screen 202 for playout. The curve in this diagram indicates how the monitored signal quality varies over time and it decreases, e.g. due to worsening weather causing declined signal propagation conditions, such that the quality eventually falls below the first threshold TH1 from a time $t_1$. The logic unit 200d compares the monitored quality with TH1 when the first reception mode is used. At this point when finding that signal quality <TH1, the logic unit 200d switches operation from the first reception mode to the second reception mode while the monitoring unit 200c continues to monitor the signal quality although the signal is no longer used for playing out the TV service. When operating in the second reception mode, the second receiving unit 200b provides signals to the TV screen 202 for playout while the logic unit 200d compares the monitored quality with TH2. In due course, the signal quality goes up again, e.g. due to improved weather, and the monitored quality exceeds the second threshold TH2 from a time $t_2$. Thus, when finding that signal quality >TH2, the logic unit 200d switches operation from the second reception mode back to the first reception mode.

FIG. 3b shows another example where the signal quality first decreases and falls below the first threshold TH1 at a time $t_1$ and is then improved later on and exceeds the second threshold TH2 at a time $t_3$. In this example, the logic unit 200d switches operation from the first reception mode to the second reception mode when the monitored quality of the broadcasted signals has remained below the first threshold TH1 for a first time interval T1 from $t_1$, which occurs at a time $t_2$. In a corresponding manner, the logic unit switches operation from the second reception mode back to the first reception mode when the monitored quality of the broadcasted signals has remained above the second threshold TH2 for a second time interval T2 from $t_3$, which occurs at a time $t_4$.

These two time intervals T1 and T2 may likewise be automatically adjustable based on the amount of variations or fluctuations of the monitored quality. For example if the variations in signal quality are great, it could be beneficial to automatically increase one or both of the time intervals T1 and T2, thus requiring more long-lasting and trustworthy quality decline or improvement, respectively, to warrant a switch of reception mode during such conditions. It is also possible to configure the logic unit 200d to wait with switching from the second reception mode back to the first reception mode until a minimum duration has elapsed since switching to the second mode, even if the signal quality has remained above the second threshold for the second time interval T2 well before this minimum duration has elapsed, again to avoid too frequent switch of reception modes.

Figure 4:
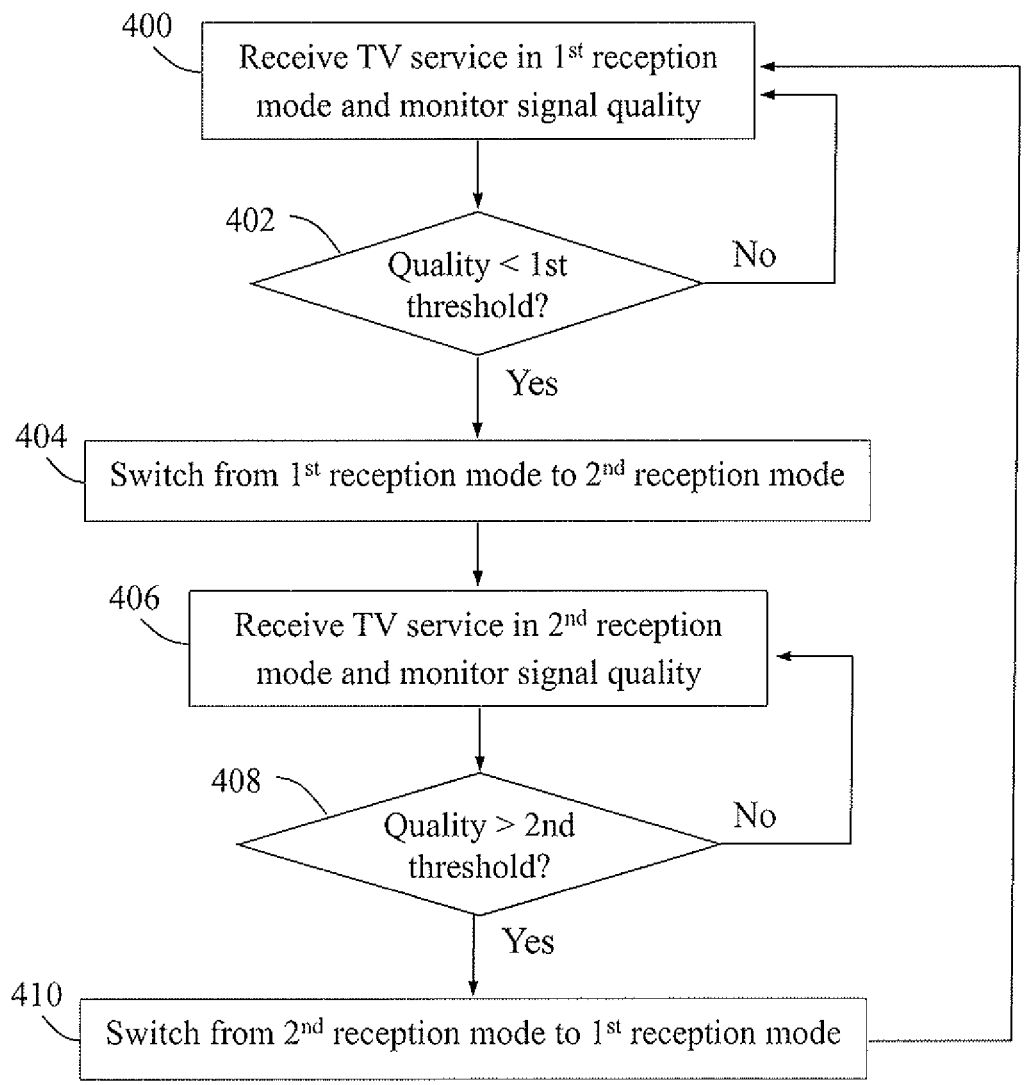
FIG. 4 is a flow chart illustrating a more detailed example of a procedure in a user node receiving a TV service, according to further possible embodiments.

A more detailed example of a procedure in a user node will now be described with reference to the flow chart of FIG. 4. Likewise, it is assumed that the user node is operable in the first reception mode and in the second reception mode for receiving and playing out a TV service, and that at least the above-described first and second thresholds have been configured in the user node.

In a first action 400, the user node receives the TV service as broadcasted signals over the air in the first reception mode and monitors the quality of the broadcasted signals, basically corresponding to action 100 above. The user node determines whether the monitored signal quality is lower than the first threshold, in a further action 402. If not, the user node continues to monitor the signal quality as of action 400. When the signal quality is below the first threshold, the user node switches operation from the first reception mode to the second reception mode, in a next action 404.

As a result, the user node receives the TV service as a media stream over the IPTV link in the second reception mode and continues to monitor the quality of the broadcasted signals, in a further action 406. When operating in the second reception mode, the user node determines whether the monitored signal quality is higher than the second threshold, in a further action 408. If not, the user node continues to monitor the signal quality as of action 406. When the signal quality is higher than the second threshold, the user node switches operation from the second reception mode back to the first reception mode, in a next action 410. Thereafter, the process may return to action 400.

Some useful examples of how the above-described embodiments may be implemented in practice, will now be outlined with reference to FIG. 2. In order to instruct the first and second receiving units 200a and 200b to start and stop decoding streams the logic unit 200d relies on the fact that it knows the currently tuned channel "CHX" of the TV service. Both receiving units 200a and 200b may have the same notion of channel information about the ongoing TV service, e.g. in the form of a single channel identifier or the like that may be understood by both receiving units 200a and 200b, or the logic unit 200d may know about the channel tables for both receiving unit 200a and receiving unit 200b and how to make a mapping between these channel tables with respect to the TV service.

When a switch from the first reception mode to the second reception mode is warranted, the logic unit 200d may call a so-called stopPlayback( ) method on the first receiving unit 200a and a so-called tuneTo(CHX) method on the second receiving unit 200b. The latter unit 200b will then open an IP connection towards the IPTV server 206 and start receiving the media stream 206a over the IPTV link. Similarly, when a switch from the second reception mode to the first reception mode is warranted, the logic unit 200d may call the stopPlayback( ) method on the second receiving unit 200b and the tuneTo(CHX) method on the first receiving unit 200a. The latter unit 200a may then tune e.g. its broadcast tuner to the CHX channel, if not already done, and start receiving the stream. It should be noted that the above method names "stopPlayback" and "tuneTo" are merely un-limiting examples. Each platform of different user nodes may have and use its own, specific, names of commands, methods and/or functions.

By implementing one or more of the above-described embodiments, it is possible to ensure a virtually continuous playout of the TV service with maintained user experience and as low costs as possible, and also without causing more load on the network than really necessary.

While the solution has been described with reference to specific exemplary embodiments, the description is generally only intended to illustrate the inventive concept and should not be taken as limiting the scope of the solution. For example, the terms "user node", "reception mode", "TV service", "signal quality", "broadcasted signals", "media stream" and "threshold" have been used throughout this description, although any other corresponding entities, functions, and/or parameters could also be used having the features and characteristics described here. The solution is defined by the appended claims.

The invention claimed is:

1. A method in a user node for enabling reception of a television (TV) service, the user node capable of operating in a first reception mode of receiving the TV service as over-the-air broadcasted signals and in a second reception mode of receiving the TV service as a media stream over an Internet Protocol Television (IPTV) link, the method comprising:
 monitoring quality of the over-the-air broadcasted signals when receiving the TV service in the first reception mode,
 controlling the user node to switch operation from presently operating in the first reception mode to next operating in the second reception mode responsive to the monitored quality of the over-the-air broadcasted signals being below a first threshold (TH1) for a first time interval,
 receiving the TV service over the IPTV link in the second reception mode for a second time interval, and
 further controlling the user node to switch operation from presently operating in the second reception mode back to operating in the first reception mode responsive to the monitored quality of the over-the-air broadcasted signals being above a second threshold (TH2) for a third time interval,
 wherein the first time interval and the third time interval are adjusted by the user node based on a determined amount of fluctuations in the monitored quality of the over-the-air broadcasted signals.

2. The method according to claim 1, wherein the second threshold is higher than the first threshold.

3. The method according to claim 1, wherein at least one of the first and second thresholds is adjustable based on the amount of fluctuations of the monitored quality.

4. The method according to claim 1, wherein switching the operation from the first reception mode to the second reception mode comprises establishing an IPTV session to receive a TV channel that the user node is tuned to when receiving the TV service in the first reception mode.

5. The method according to claim 1, wherein signals received over the IPTV link in the second reception mode comprise a lower resolution than the over-the-air broadcasted signals.

6. The method according to claim 1, further comprising:
 tuning, prior to switching from the second reception mode to the first reception mode, a receiving unit associated with the first reception mode to receive a TV channel that the user node is tuned to when receiving the TV service in the second reception mode.

7. A user node configured to enable reception of a TV service, the user node being adapted to operate in a first reception mode of receiving the TV service as over-the-air broadcasted signals and in a second reception mode of receiving the TV service as a media stream over an Internet Protocol Television, IPTV, link, the user node comprising:
 a first receiving unit adapted to receive the TV service in the first reception mode from an antenna;
 a second receiving unit adapted to receive the TV service in the second reception mode from an IPTV server;
 at least one processor; and
 memory storing executable instructions that, when executed by the at least one processor, cause the processor to perform operations comprising:
  monitoring quality of the over-the-air broadcasted signals when receiving the TV service in the first reception mode,
  switching from operating in the first reception mode to operating in the second reception mode responsive to the monitored quality of the over-the-air broadcasted signals being below a first threshold for a first time interval,
  receiving the TV service over the IPTV link in the second reception mode for a second time interval, and
  switching from operating in the second reception mode back to operating in the first reception mode responsive to the monitored quality of the over-the-air broadcasted signals being above a second threshold (TH2) for a third time interval,
  wherein the first time interval and the third time interval are adjusted by the processor based on an determined amount of fluctuations in the monitored quality of the over-the-air broadcasted signals.

8. The user node according to claim 7, wherein the second threshold is higher than the first threshold.

9. The user node according to claim 7, wherein the memory stores further executable instructions that, when executed by the at least one processor, cause the processor to perform operations comprising:
 adjusting at least one of the first and second thresholds based on the amount of fluctuations of the monitored quality of the over-the-air broadcasted signals.

10. The user node according to claim 7, wherein the memory stores further executable instructions that, when executed by the at least one processor, cause the processor to perform operations comprising:
 establishing, when the operation is switched from the first reception mode to the second reception mode, an IPTV session to receive a TV channel that the user node is tuned to when receiving the TV service in the first reception mode.

11. The user node according to claim 7, wherein the signals received in the second reception mode comprise a lower resolution than the over-the-air broadcasted signals.

12. The user node according to claim 7, wherein the memory stores further executable instructions that, when executed by the at least one processor, cause the processor to perform operations comprising:
 tuning, prior to switching from the second reception mode to the first reception mode, the first receiving unit to receive a TV channel that the user node is tuned to when receiving the TV service in the second reception mode.

13. A method in a user node for enabling reception of a television (TV) service, the user node capable of operating in a first reception mode of receiving the TV service as over-the-air broadcasted signals and in a second reception mode of receiving the TV service as a media stream over an Internet Protocol Television (IPTV) link, the method comprising:
 monitoring quality of the over-the-air broadcasted signals when receiving the TV service in the first reception mode,
 determining an amount of variations in the quality of the over-the-air broadcasted signal;
 selecting a first time interval and a second time interval based on the amount of variations;
 switching operation from presently operating in the first reception mode to next operating in the second reception mode responsive to the monitored quality of the over-the-air broadcasted signals being below a first threshold (TH1) for the first time interval; and switching operation from presently operating in the second reception mode back to operating in the first reception mode responsive to the monitored quality of the over-the-air broadcasted signals being above a second threshold (TH2) for the second time interval.

14. The method according to claim 13, further comprising:

selecting at least one of the first and second thresholds based on the amount of variations in the quality.

15. The method according to claim 13, wherein the second time interval is longer than the first time interval.

16. The method according to claim 13, wherein the second threshold is higher than the first threshold.

* * * * *